(12) United States Patent  (10) Patent No.: US 7,497,651 B2
Harberts et al.  (45) Date of Patent: Mar. 3, 2009

(54) SECUREMENT MECHANISM

(75) Inventors: John H. Harberts, Macomb, MI (US); John E. Klinkman, Riley Township, MI (US)

(73) Assignee: SportRack LLC, Sterling Heights, MI (US)

( * ) Notice: Subject to any disclaimer, the term of this patent is extended or adjusted under 35 U.S.C. 154(b) by 264 days.

(21) Appl. No.: 11/407,420

(22) Filed: Apr. 20, 2006

(65) Prior Publication Data

US 2006/0257225 A1 Nov. 16, 2006

Related U.S. Application Data

(63) Continuation-in-part of application No. 11/101,984, filed on Apr. 8, 2005, now Pat. No. 7,156,593, and a continuation-in-part of application No. 10/825,456, filed on Apr. 15, 2004, now Pat. No. 7,040,849.

(60) Provisional application No. 60/463,291, filed on Apr. 16, 2003.

(51) Int. Cl.
*B61D 45/00* (2006.01)
(52) U.S. Cl. ..................................... 410/101
(58) Field of Classification Search ................ 410/101, 410/102, 104, 106, 107, 110, 115, 116; 24/265 CD, 24/115 K; 248/499
See application file for complete search history.

(56) References Cited

U.S. PATENT DOCUMENTS

| | | | |
|---|---|---|---|
| 1,358,688 A * | 11/1920 | Lyon | 293/140 |
| 1,669,187 A * | 5/1928 | Campbell | 403/21 |
| 3,643,973 A | 2/1972 | Bott | |
| 3,951,444 A * | 4/1976 | Shull | 292/359 |
| 4,545,697 A * | 10/1985 | Verdenne et al. | 403/230 |
| 5,655,865 A * | 8/1997 | Plank et al. | 411/85 |
| 5,893,538 A * | 4/1999 | Onishi et al. | 248/65 |
| 5,947,356 A * | 9/1999 | Delong | 224/404 |
| 6,290,426 B1 * | 9/2001 | van Gijsel et al. | 403/374.3 |

(Continued)

FOREIGN PATENT DOCUMENTS

DE 100 18 635 A1 11/2000

(Continued)

OTHER PUBLICATIONS

International Search Report (2 pages).

(Continued)

*Primary Examiner*—H Gutman
(74) *Attorney, Agent, or Firm*—Rader, Fishman & Grauer PLLC

(57) ABSTRACT

A securement mechanism includes a tie-down cleat assembly for engagement with a mating component, the tie-down cleat assembly including a pin, a lock plate adjacent to one of the ends of the pin, and a housing having an aperture receiving the pin. An actuating member is operationally connected to the pin and causes selective movement of the pin and lock plate between a secured and unsecured orientation. The lock plate has a first dimension permitting the lock plate to be inserted into a channel associated with the mating component and a second dimension permitting the securement of the mating component between the housing and locking plate. The pin and locking plate and preferably the housing are all rotatable as a single unit.

14 Claims, 19 Drawing Sheets

U.S. PATENT DOCUMENTS

| | | | |
|---|---|---|---|
| 6,585,465 | B1 | 7/2003 | Hammond et al. |
| 6,644,901 | B2 | 11/2003 | Breckel |
| 6,712,568 | B2 * | 3/2004 | Snyder et al. ............... 410/104 |
| 6,827,531 | B2 | 12/2004 | Womack et al. |
| 6,846,140 | B2 | 1/2005 | Anderson et al. |
| 7,070,374 | B2 * | 7/2006 | Womack et al. ............. 410/104 |
| 7,175,377 | B2 * | 2/2007 | Womack et al. ............. 410/104 |

FOREIGN PATENT DOCUMENTS

| | | |
|---|---|---|
| EP | 0 945 307 A2 | 9/1999 |
| WO | WO-01/54947 A1 | 8/2001 |

OTHER PUBLICATIONS

Derwent English Abstract for DE 100 18 635 A1.

Non-Final Office Action dated Sep. 1, 2005 in U.S. Appl. No. 10/825,456 (10 pages).

* cited by examiner

| Label | Part Name | Material | Yield Strength | Ultimate/ Tensile Strength | Elongation | Poisson's Ratio | E |
|---|---|---|---|---|---|---|---|
| 18 | Tie Down | Aluminum A413 | 131 Mpa | 290 Mpa | 3.5 (% in 2") | 0.33 | 75.8 Gpa |
| 40 | Thumb Wheel | Aluminum A413 | 131 Mpa | 290 Mpa | 3.5 (% in 2") | 0.33 | 75.8 Gpa |
| 20 | Base Plate | Aluminum A413 | 131 Mpa | 290 Mpa | 3.5 (% in 2") | 0.33 | 75.8 Gpa |
| 38 | Nut/Washer Asm | Nut - 1010 - 1020 Steel | 303 Mpa | 365 Mpa | 20 (% in 2") | 0.29 | 203.3 Gpa |
| | | Washer - 1050 Spring Steel | 579 Mpa | 689 Mpa | 12 (% in 2") | 0.29 | 203.3 Gpa |
| 36 | Thrust Washer | S.S. 302 - 304 | 276 Mpa | 568 Mpa | 1.67 (frac. strain) | 0.28 | 189.6 Gpa |
| 32 | Pin | S.S. 302 - 304 | 276 Mpa | 568 Mpa | 1.67 (frac. strain) | 0.28 | 189.6 Gpa |
| 30 | Lock Plate | S.S. 302 - 304 | 276 Mpa | 568 Mpa | 1.67 (frac. strain) | 0.28 | 189.6 Gpa |
| 22 | Bolt - 8mm | S.S. 302 - 304 | 276 Mpa | 568 Mpa | 1.67 (frac. strain) | 0.28 | 189.6 Gpa |
| 23 | Washer - 8mm | S.S. 302 - 304 | 276 Mpa | 568 Mpa | 1.67 (frac. strain) | 0.28 | 189.6 Gpa |
| 24 | Nut - 8mm | S.S. 302 - 304 | 276 Mpa | 568 Mpa | 1.67 (frac. strain) | 0.28 | 189.6 Gpa |
| 34 | Retainer | | | | | | |
| 12 | Bed Rail | T6 - 6063 Anodized Al | 213 Mpa | 241 Mpa | 12 (% in 2") | 0.35 | 70.3 Gpa |

FIG. 5

SECUREMENT MECHANISM

RELATED APPLICATIONS

The disclosures of U.S. Provisional Application No. 60/463,291, filed Apr. 16, 2003; U.S. patent application Ser. No. 11/101,984, filed Apr. 8, 2005; and U.S. patent application Ser. No. 10/825,456, filed Apr. 15, 2004 are herein incorporated by reference in their entireties, including their specifications, claims, and drawings.

FIELD OF TECHNOLOGY

The embodiments described herein are directed to an innovative tie-down cleat assembly loaded onto a rail or any vehicle surface and secured in position.

BACKGROUND

Tie-down cleats are commonly used with rails having channels defined by sidewalls and a bottom surface disposed between the sidewalls. The top of each sidewall typically has an inwardly extending leg disposed above the bottom surface. The tie-down cleat is disposed along a rail with a portion of the tie-down cleat including a lock plate being received within the channel, and movement being selectively constrained through interaction of the cleat with at least a subset of the sidewalls, bottom surface, and legs.

Typically, a tie-down cleat is associated with a rail using one of two approaches. One approach is to remove an end cap and then insert the portion of the cleat including the lock plate into the end of the rail. A problem with this approach is that a user has to physically remove a component to allow for installation of the cleat. The end cap may be lost, become damaged, or be difficult to reinstall. Moreover, the end of the rail must be accessible, typically reducing the overall length of rail available for use.

Another well known approach is to have a notch added at each of a plurality of discrete points along the rail, wherein the portion of the cleat including the lock plate is inserted into the notch and then the tie-down cleat is slid away from the notch before the cleat is locked into position at a fixed point away from the notch. The amount of usable rail length available to a consumer is reduced by adding a notch to the rail channel. Further, under some circumstances, if the cleat becomes unsecured or creeps along the rail, it can suddenly escape from a notch.

Accordingly, it is desirable to provide an improved tie-down cleat assembly allowing installation without removing a component such as an end cap. It would further be highly desirable to provide such a mechanism that may be secured anywhere along a vehicle surface adapted to receive it while securing various cargo.

BRIEF SUMMARY

The described embodiments provide a solution to known problems in the prior art by providing an innovative securement mechanism having a tie-down cleat assembly and a locking member such as a rail. The rail has a continuously extending channel along its longitudinal length, the channel being defined by a web disposed between opposing siderails and legs extending into the channel from free ends of each siderail. In one embodiment, the rail has a somewhat C-shaped cross-section. An end cap may be permanently secured to the rail and notches are not required. The tie-down assembly is top loaded into the rail and secured into position. The tie-down assembly may also be secured anywhere along a vehicle surface adapted to receive it.

The assembly includes a housing that accommodates one-handed gripping and turning by a user while providing the ability to attach items to the assembly. A pin is disposed through the housing. The assembly further includes a lock plate adjacent to a free end of the pin. The lock plate has a first dimension suitable for insertion into the channel of the locking member and a second dimension capable of gripping the underside of the legs in a locked and secured position. The assembly preferably further includes an actuating member capable of moving the pin and lock plate up and down between secured and unsecured orientations with respect to the rail.

The pin and actuating member are threadingly engaged with one another such that rotation of the actuating member moves the pin and attached locking plate up and down. To prevent the pin from rotating at the same time, the actuating member is rotated, it typically includes at least a partial non-circular cross-section. The mating portion of the housing includes a noncircular feature that complements the noncircular cross-section of the pin to the extent that rotation of the pin within the housing is minimized as the actuating member is rotated.

During operation, the user can install the tie-down assembly by loading the lock plate into the rail by aligning the first dimension with the space between the rail legs and then rotating the lock plate until the second dimension is capable of engaging the underside of the legs. In a preferred embodiment, the entire housing is rotated approximately ninety degrees (90°), simultaneously rotating the lock plate at the same time. Thus, the tie-down assembly is typically rotated as one component. The actuating member is then activated to move the pin and lock plate into a secured orientation, as by clamping.

BRIEF DESCRIPTION OF THE DRAWINGS

The features and inventive aspects of the exemplary embodiments will become more apparent upon reading the following detailed description, claims, and drawings, of which the following is a brief description:

FIG. 5 is a table showing exemplary material properties of select elements of the tie-down cleat assembly of FIG. 1;

DETAILED DESCRIPTION

Figure 1:
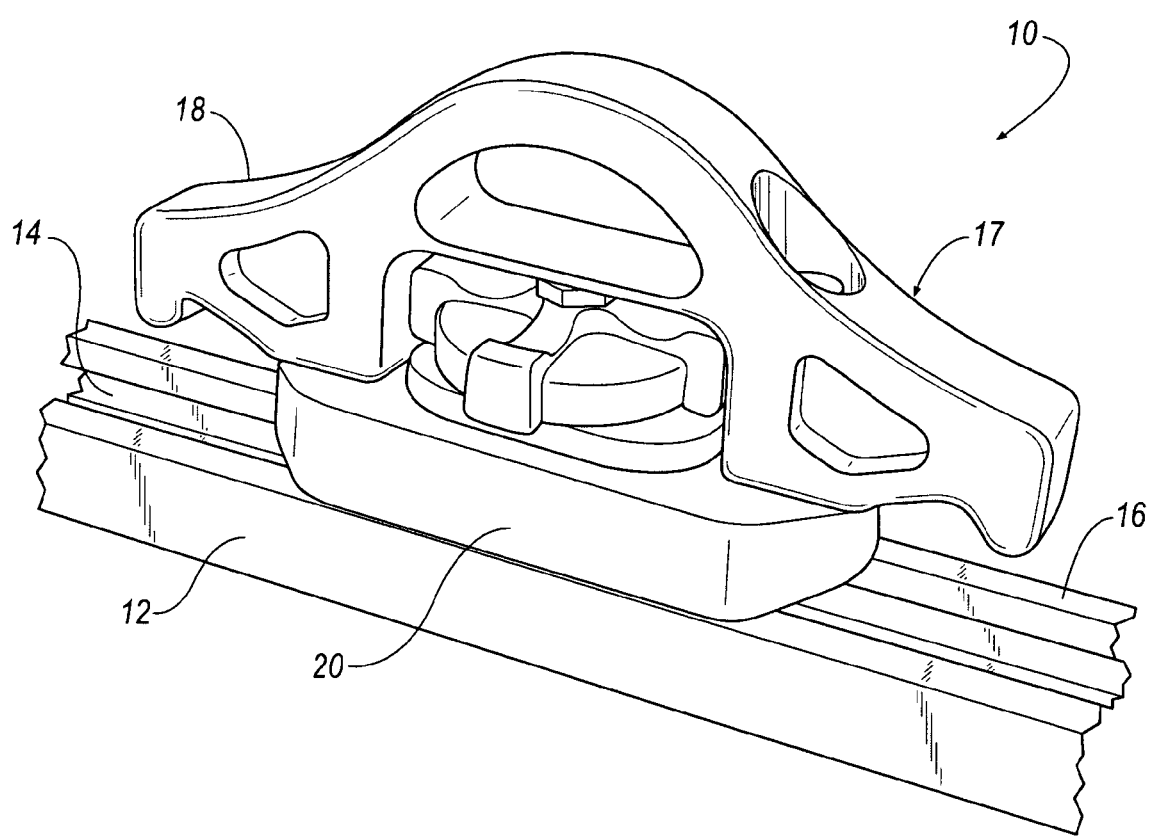
FIG. 1 is a perspective view according to one embodiment of a tie-down cleat assembly shown in a secured orientation on a mating rail.

Referring now to the drawings, exemplary embodiments are shown in detail. Although the drawings represent exemplary embodiments, the drawings are not necessarily to scale and certain features may be exaggerated. Further, the embodiments set forth herein are not intended to be exhaustive or otherwise limit or restrict the invention to the precise forms and configurations shown in the drawings and disclosed in the following detailed description.

FIGS. 1-7 are directed to an innovative securement mechanism including a tie-down cleat assembly 10 and mating component in the form of a locking member or rail 12.

Figure 6:
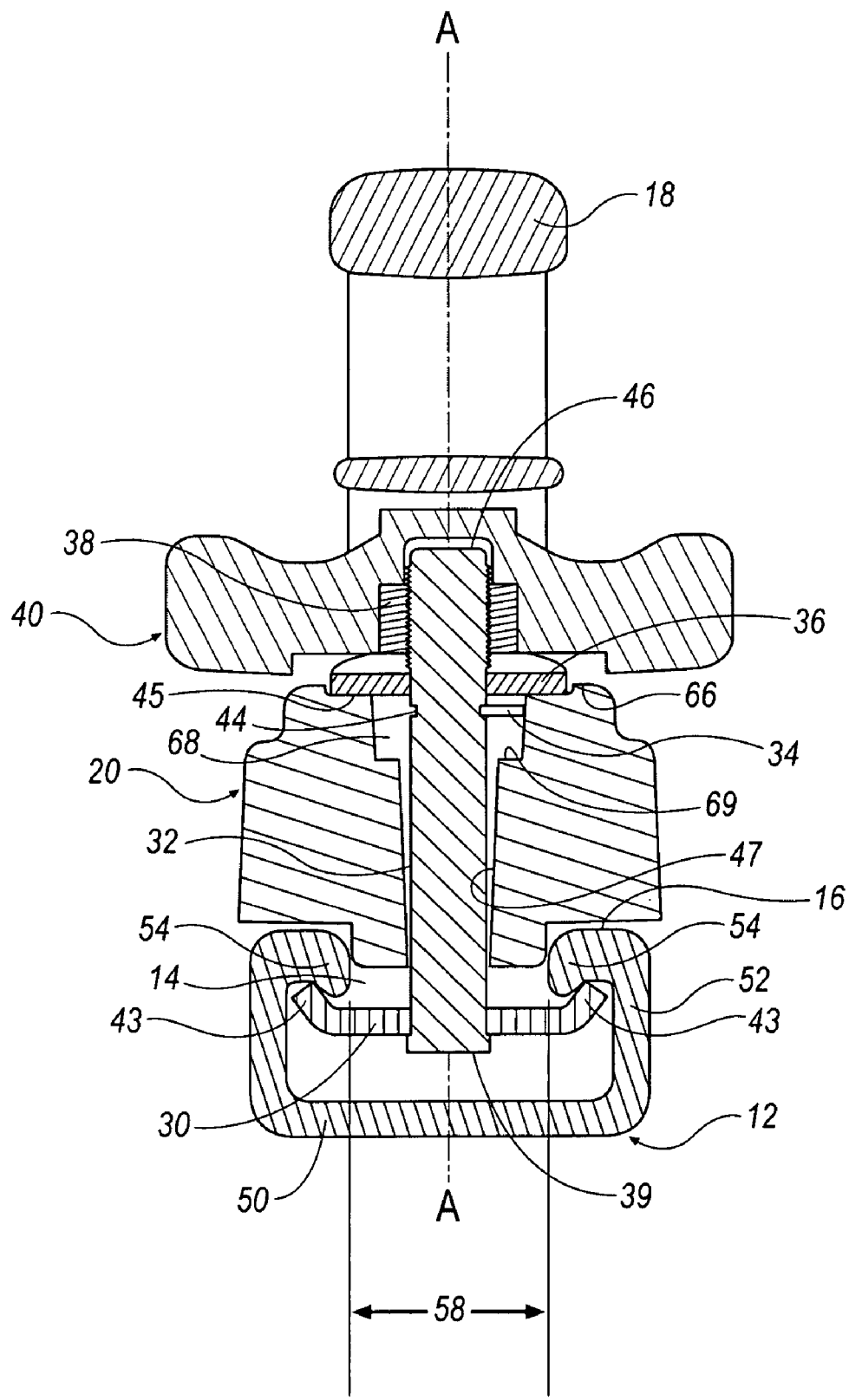
FIG. 6 is a cross-sectional view of the tie-down cleat assembly of FIG. 1 in a final secured orientation with respect to the corresponding rail.

Rail 12 is formed with a continuously extending channel 14 along its length. The channel 14 of the rail 12 is defined by a web or bottom surface 50 disposed between opposing siderails 52, legs 54 extending into the channel from a free end of each siderail (as best shown in FIG. 6). An end cap (not shown) may be permanently secured to the rail 12, which may or may not contain notches. When there are no notches, legs 54 are uninterrupted along the length of rail 12.

Tie-down cleat assembly 10 is placed on a top surface 16 of the rail 12 and secured into position. While a rail is shown, locking member 12 may also be a corresponding hole, passage, or pocket anywhere on a vehicle surface (not shown).

Figure 3:
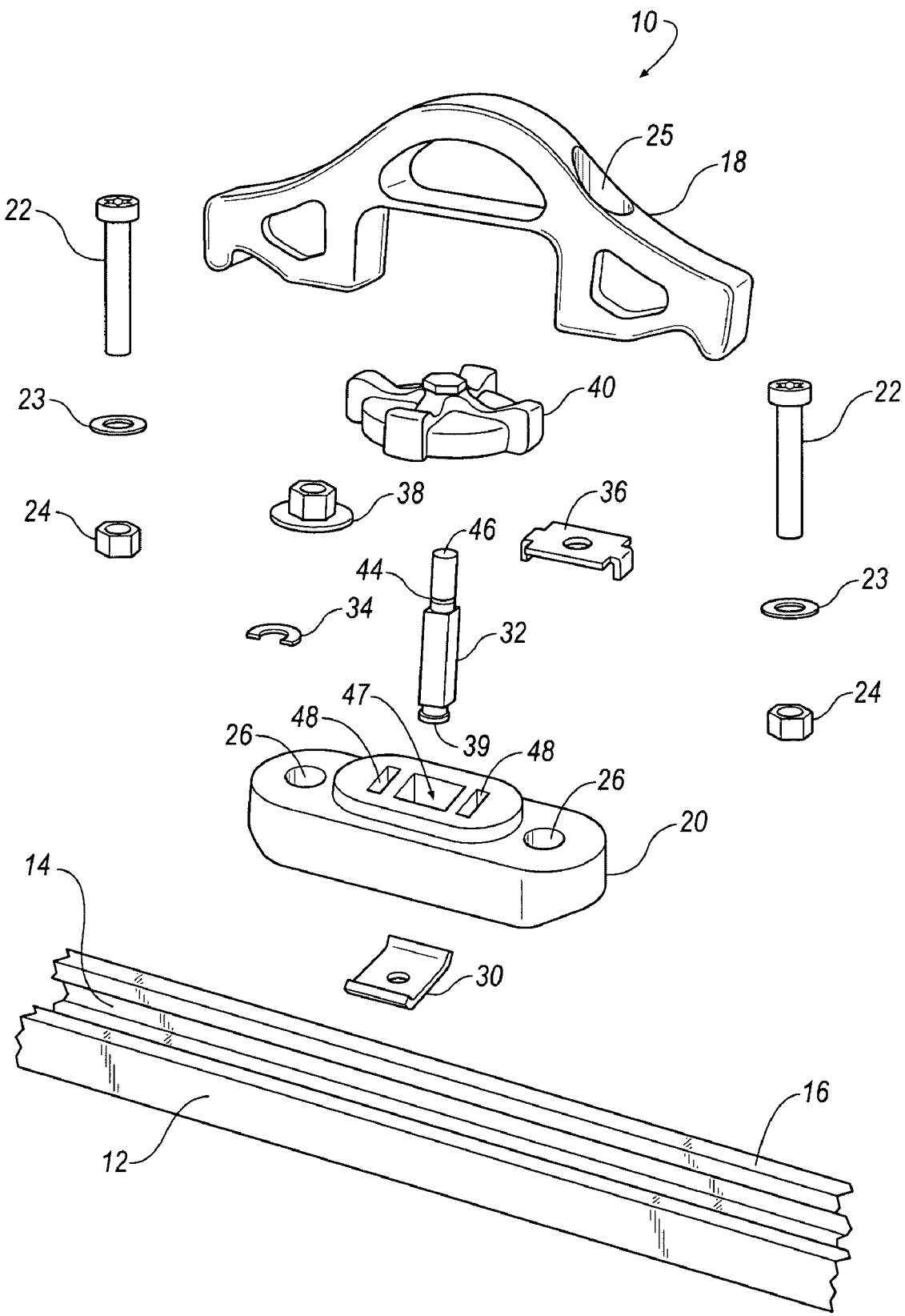
FIG. 3 is an exploded perspective view of the assembly of FIG. 1, showing the various elements of one embodiment of the tie-down cleat assembly and corresponding rail.
Figure 7:
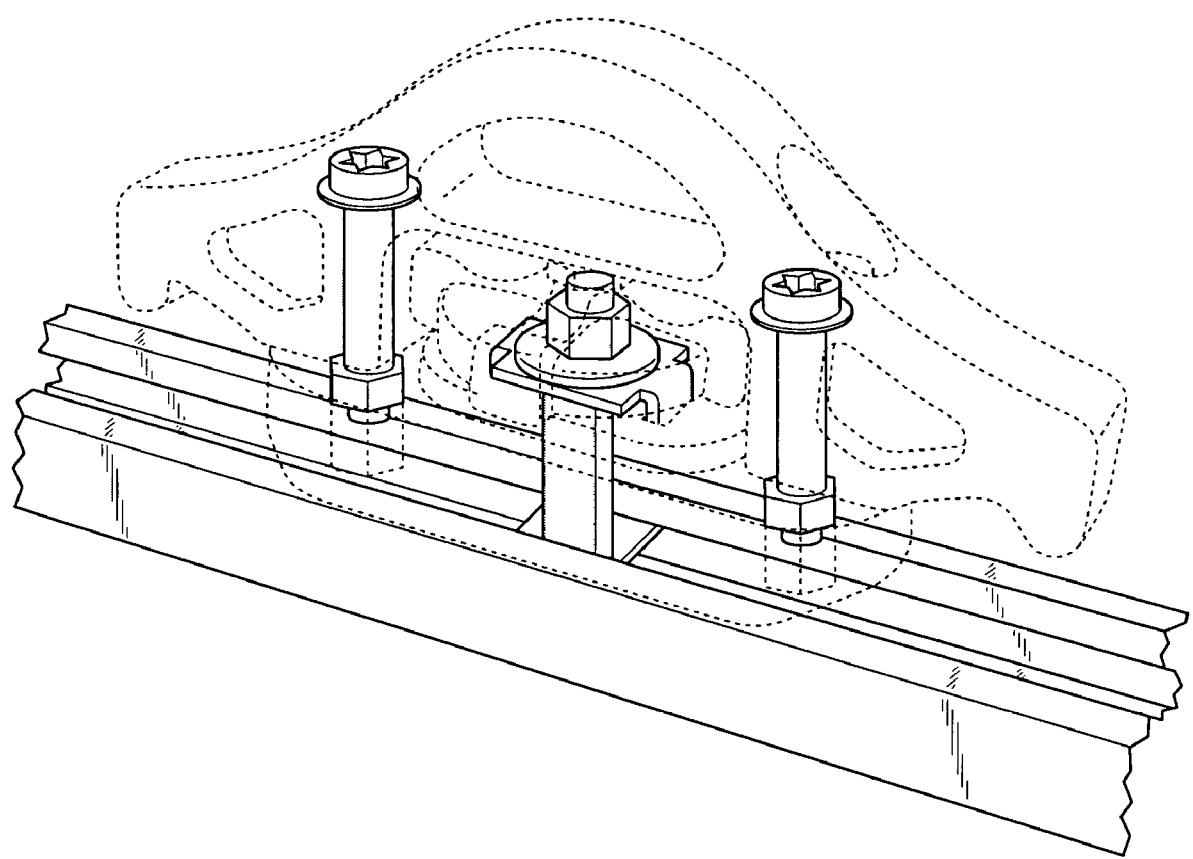
FIG. 7 is a perspective view of the tie-down cleat assembly of FIG. 1 with a cutaway portion to the interior of the assembly.
Figure 8:
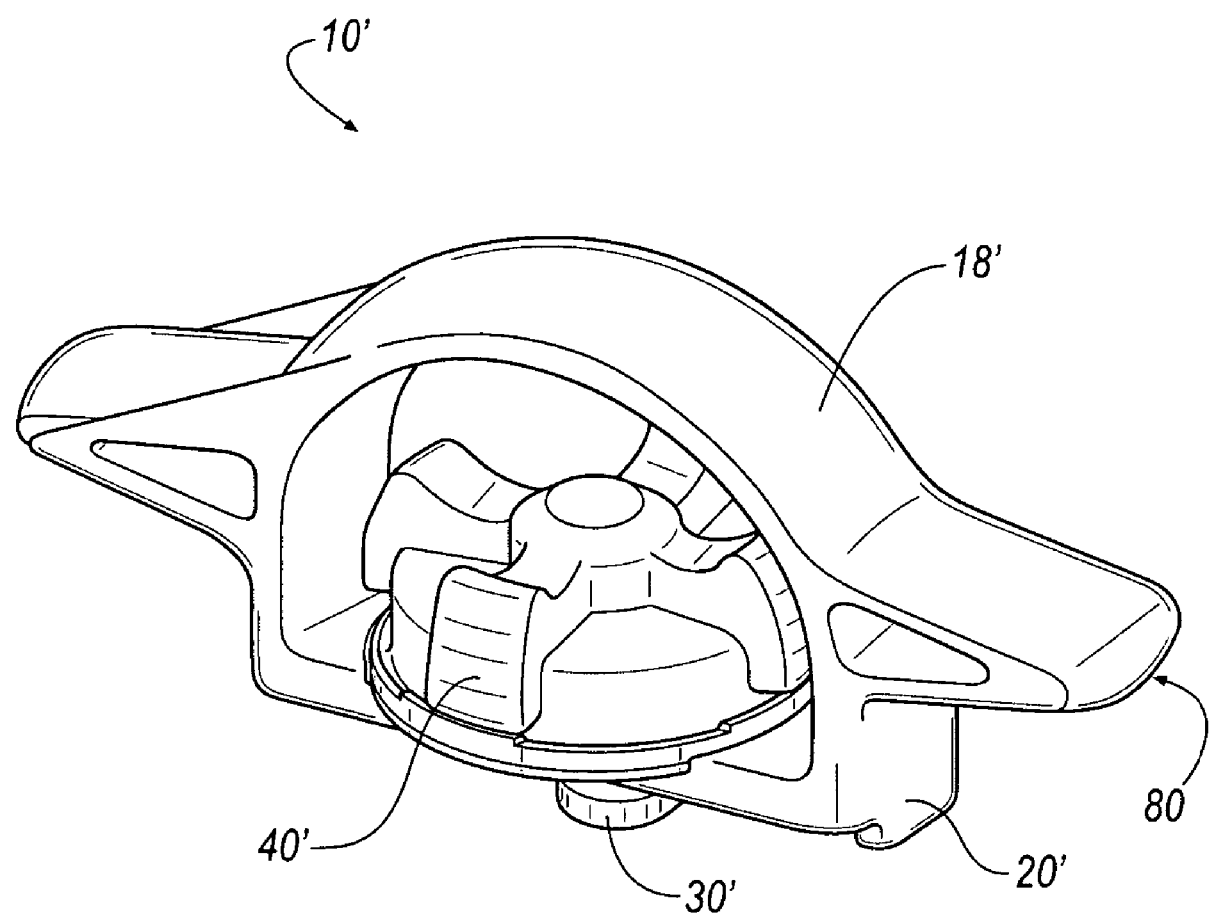
FIG. 8 is a perspective view of the tie-down cleat assembly according to an alternative exemplary embodiment showing a one-piece tie-down and a ratcheting cap.

The innovative tie-down cleat assembly 10 includes a housing 17 comprising a tie-down 18 and a base plate 20 that rides along the top surface 16 of the rail 12 or vehicle surface (not shown). As best shown in FIG. 3, the tie-down 18 is secured to the base plate 20 by way of typical fasteners such as bolts 22, washers 23, and nuts 24. In FIG. 7 assembly 10 is in a locked position.

The bolts 22 are placed through a counterbore 25 in tie-down 18 and then through a corresponding counterbore hole 26 of the base plate 20. The head of each bolt engages a bottom surface of one of counterbores 25 and 26 and the washer and nut engage the bottom surface of the other counterbore.

Figure 4:
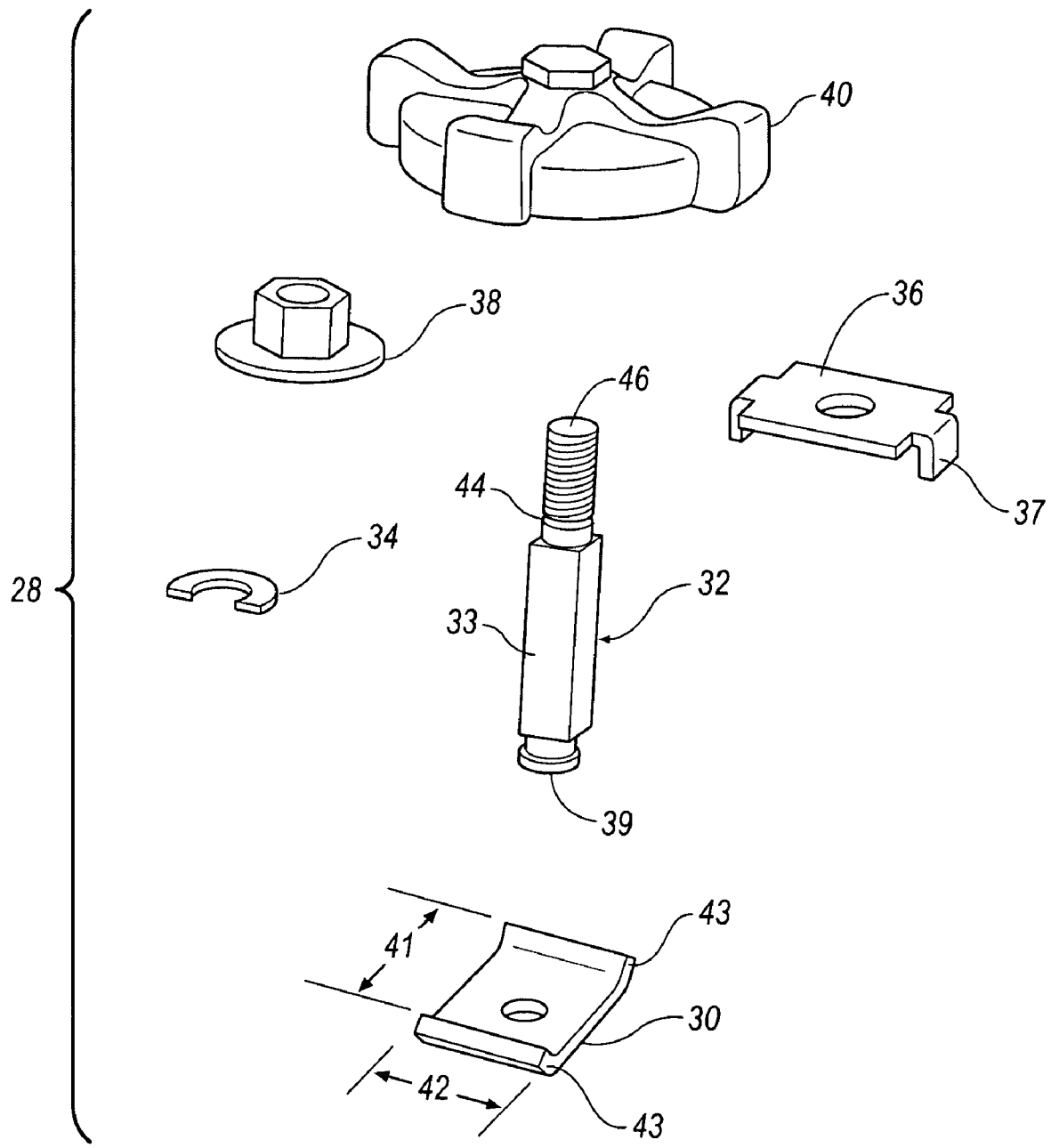
FIG. 4 is an exploded perspective view of a lock plate subassembly of the tie-down cleat assembly in of FIG. 1.

In turn, the subassembly of the tie-down 18 and base plate 20 is secured to the rail 12 using a lock plate subassembly 28 as shown in FIG. 4. Lock plate subassembly 28 includes a lock plate 30, a pin 32, a retainer 34, a thrust washer 36 with downwardly extending tabs 37, a nut and washer combination 38, and an actuating member 40. The lock plate 30 is rigidly secured to the first free end 39 of the pin 32. Thus, as the pin 32 is rotated, the lock plate 30 is rotated to the same angular extent. Thus, the lock plate 30 does not spin independently of the pin 32. In an alternative embodiment, lock plate 30 and pin 32 may be a single component.

The lock plate 30 includes a first dimension 41 and a second dimension 42 is greater than the first dimension 41. In the indicated embodiment, lock plate 30 is generally rectangular with the first dimension being the short edge and the second dimension being the long edge. Lock plate 30 also has two optional extending ears 43 to help facilitate the selective gripping of legs 54 of rail 12 when the assembly 10 is in a final secured orientation as discussed below.

Pin 32 includes a threaded second end 46 and a noncircular cross-section 43 disposed along a portion of the pin between first end 39 and second end 46. While a "square" cross-section is shown, generally any noncircular shape will be acceptable.

As best shown in FIGS. 6 and 7, lock plate subassembly is shown inserted through a mating aperture 47 of base plate 20. Aperture 47 is shown tapered in cross-section so that up and down movement of pin 32 is unimpeded even if the pin is offset from illustrated axis A-A. Aperture 47 includes a noncircular periphery along at least a portion of its longitudinal extent that mates with the corresponding surface of pin 32 in an interference fit upon pin rotation such that while the pin 32 may move up and down within the aperture 47, at most minimal rotation is permitted between pin 32 and base plate 20. As a result, as the pin 32 is rotated, the base plate 20 and tie-down 18 are rotated to substantially the same angular extent. Moreover, while the lock plate 30 is shown secured to the pin 32 using typical welding or related securement techniques, it could instead also include a corresponding noncircular aperture (not shown) to minimize rotation of the lock plate 30 with respect to the pin 32.

Aperture 47 also includes a counterbore 68 with a bottom surface 69 and counterbore 68 spaced from an upper end 66 of the base plate. A retainer 34 is secured to pin 32 at a radially inwardly extending notch 44 and extends radially outwardly from the outer periphery of pin 32. Retainer 34 selectively contacts bottom surface 69 of counterbore 68 to prevent pin 32 from escaping through aperture 47. On the other hand, the longitudinal extent of counterbore 68 is such that retainer 34 does not prohibit the securing of the assembly 10. As illustrated in FIG. 6, even when assembly 10 is in a secured orientation, retainer 34 has not escaped from counterbore 68. Thus, as the pin 32 moves up and down within the tie-down cleat assembly 10 along axis A-A, the retainer 34 moves with the pin 32. The radial extent of counterbore 68 is greater than that of the aperture 47 and it may also include a complementary noncircular cross-section.

Finally, the uppermost portion of base plate 20 includes a counterbore 45 disposed about the periphery of aperture 47 and above counterbore 68. A thrust washer 36 is disposed in counterbore 45. A key purpose of the thrust washer 36 is to prohibit damage to the base plate 20 such as galling as the nut and washer combination 38 is rotated with respect to the pin 32, as discussed below.

When the tie-down cleat assembly 10 is in a non-secured orientation the thrust washer 36 has a tendency to move up and down along axis A-A and to twist about the longitudinally extending axis of the base plate aperture 47. Thus, in one exemplary embodiment as shown in FIG. 4, thrust washer 36 has a generally planer first surface and two generally perpendicular downwardly extending ears 37, received in corresponding pockets 48 extending into the upper surface of the base plate 20 proximate, but spaced away from counterbore 45, as shown best in FIG. 3. The two outwardly extending tabs 37 of thrust washer 36 that mate with the base plate 20 at pockets 48 generally keep thrust washer 36 in place, and prevent accidental rotation, but still permit movement of pin 32 along axis A-A. Preferably, the extent of the ears 37 with respect to axis A-A is such that they are greater than the longitudinal travel of the pin 32 between the secured and unsecured orientations of the tie-down cleat assembly 10. The counterbore 45 itself may also be shaped to prevent accidental rotation of the thrust washer 36.

The nut and washer combination 38 is secured to actuating member 40 and operationally threaded to pin 32, allowing pin 32 to move up and down along axis A-A when the actuating member is rotated rather than requiring a tool such as a wrench. Thus, actuating member 40 is rigidly secured to the nut and washer combination 38 such that rotation of the actuating member results in corresponding rotation of the nut and washer combination. It is contemplated that the actuating member 40 may be a thumbwheel, a nut, a ratcheting cap, a lever, or any component capable of accomplishing the function of moving the pin 32 up and down along axis A-A. While a threading arrangement is shown, other approaches may be used to secure lock plate subassembly 28.

Despite the clamping mechanism used, as shown in FIG. 6, the dimensions of the lock plate 30 are very important. The second dimension 42 of lock plate 30 permits the lock plate 30 to be freely inserted into the channel 14 of the rail 12 from the top surface 16 without interference from bottom surface 50, one of the sidewalls 52 or legs 54. When the lock plate 30 is rotated about axis A-A after insertion into channel 14, the extending ears 43 of lock plate 30, corresponding to the ends of first dimension 41, engage the legs 54 of the rail 12. FIG. 6 shows the lock plate 30 in an engaged and locked position where the extending ears 43 of lock plate 30 grip the legs 54 of rail 12. Typically, lock plate 30 is rotated ninety degrees (90°). Dimension 41 is greater than the space between legs 54, as represented by dimension 58, while dimension 42 is smaller than dimension 58. When lock plate 30 is rectangular, the diagonal dimension of the lock plate defined by the hypotenuse of the first edge and the second edge must be smaller than the distance between sidewalls 52 so that the assembly 10 may be freely rotated three hundred and sixty degrees (360°).

Because of the relationship between pin 32 and aperture 47 of the lock plate, and the relationship of the lock plate 20 with tie-down 18, rotation of one member preferably results in rotation of the entire tie-down assembly as a single component. As a result, when lock plate 20 is rotated into engagement with legs 54, tie-down 18 should be aligned with rail 18 in the desired orientation, which is typically parallel with the rail as shown in FIG. 1

Figure 2A:
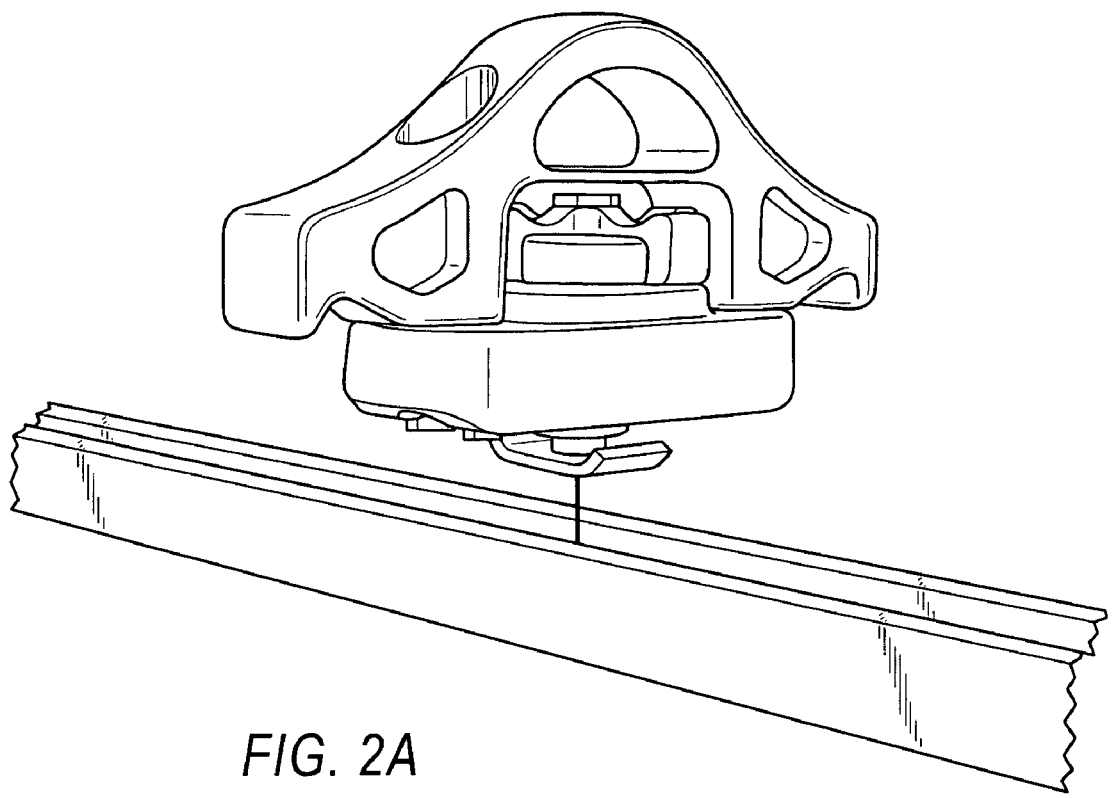
FIGS. 2A-2D show the process for securing the tie-down cleat assembly of FIG. 1 to a mating rail with the assembly approaching the rail in FIG. 2A, being inserted into the rail in FIG. 2B, starting to be rotated toward a final orientation in FIG. 2C, and shown in its final aligned orientation with the rail in FIG. 2D.
Figure 2B:
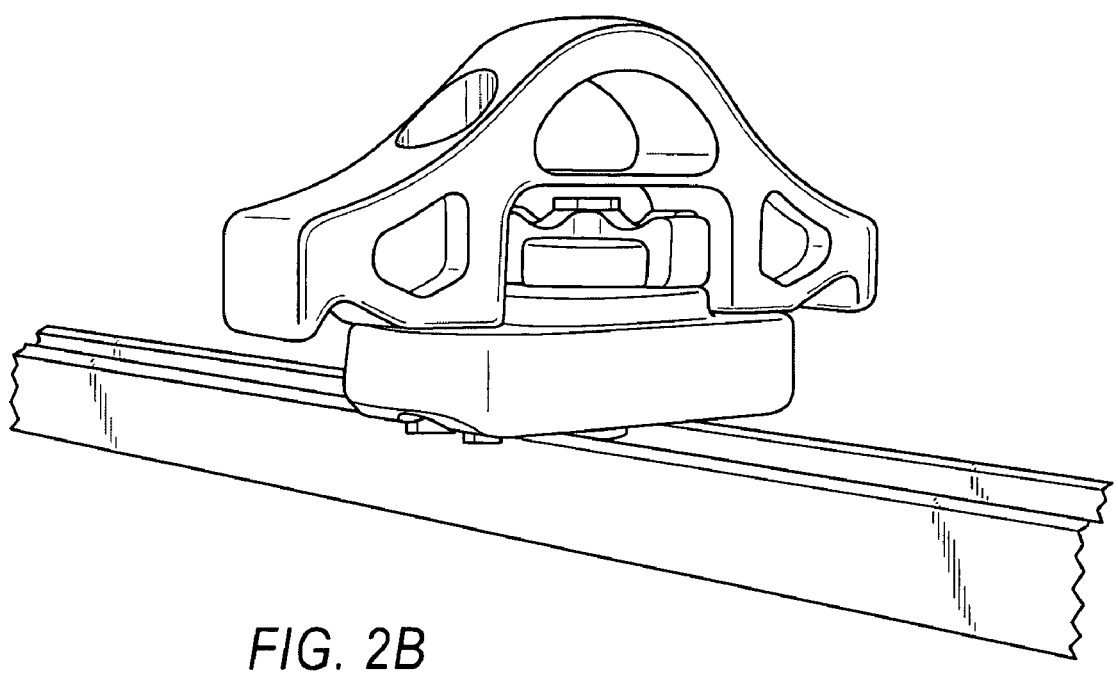
Figure 2C:
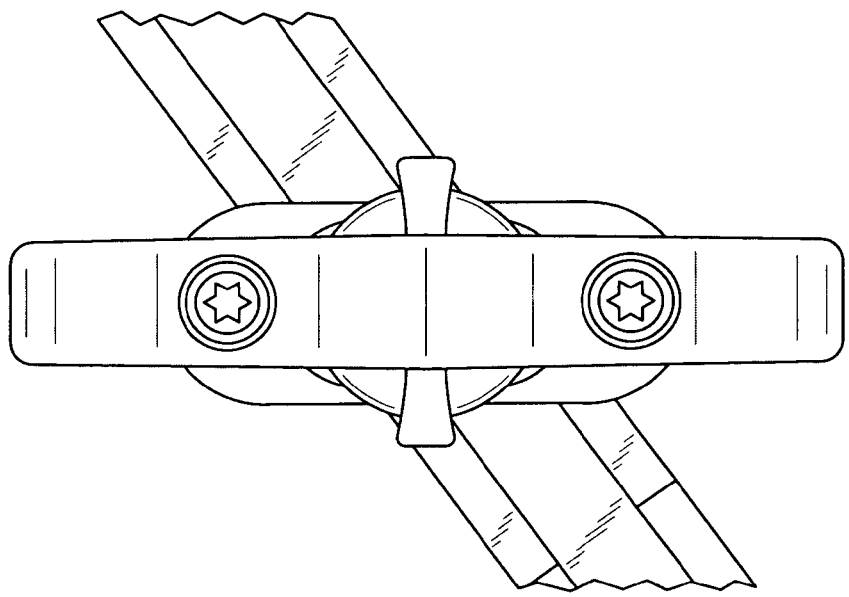
Figure 2D:
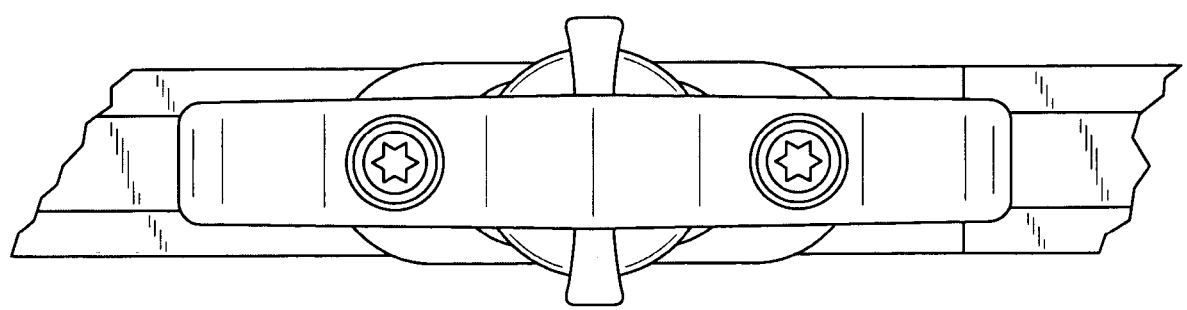

FIGS. 2A-2D show the process of securing the tie-down cleat assembly 10 to the rail 12. FIG. 2A shows the assembly 10 approaching the rail 12 with the longest dimension of the tie-down offset from the longitudinal extent of the rail. Lock plate 30 is shown with dimension 42 in alignment with channel 14 so that it may be inserted between legs 54 of the rail. In FIG. 2B the lock plate 30 is inserted into channel 14 of rail 12. In FIG. 2C, assembly 10 is being rotated until in FIG. 2D the longest dimension of the tie-down 18 is aligned with the longitudinal extent of rail 12. At the same time, dimension 42 of lock plate 20 is now positioned beneath legs 54 of rail 12. Rotation of actuating member 40 will move pin 32 up and result in the engagement of ears 43 with legs 54 and the corresponding engagement of lock plate 20 with top surface 16 of rail 12. To release assembly 10, the process is simply reversed.

To further enhance the clamping of the tie-down cleat assembly 10 to the rail 12, select mating surfaces of the rail or base plate may include surface interruptions (not shown) to increase frictional engagement. In the alternative, the upper surface of the lock plate 30 may include surface interruptions (not shown) that engage the underside of the rail ears 54.

The tie-down cleat assembly 10 is typically intended for use in vehicle application for either an article carrier (not shown) or a bed rail system (not shown). The tie-down cleat assembly 10 would be loaded through the top surface 16 of the rail 12 or channel 14 rather than through a loading notch (not shown) or end of the rail 12. This is done by keeping the movement of the lock plate 30 relative to the tie-down cleat assembly 10 minimized.

The top down loading allows a user to install the tie-down cleat assembly 10 anywhere along the length of the channel 14 without removing any existing components (not shown) and it gives the user the full length of rail 12 as usable channel 14.

Alternatively, if rail 12 does include notches within a portion of legs 54, the notch is shaped to facilitate retention of lock plate 30 in the secured orientation so that longitudinal movement of the assembly 10 is minimized. An edge of second dimension 41 would engage a corresponding notch edge formed by a portion of the leg. In one embodiment, the notch would consist of selective removal of the portion of a leg 54 extending downwardly toward a bottom surface 50 of rail 12 while still providing appropriate clamping surface.

FIG. 5 shows a table of selected elements of the assembly 10 and various material properties of the elements used in one exemplary assembly. The tie-down 18 is shown to be formed of aluminum; however, steel and plastic are also contemplated. The actuating member 40 is shown to be of aluminum and in the form of a thumb wheel; however, steel and plastic are also contemplated. In place of a thumb wheel, a ratcheting cap, a lever, or any component capable of accomplishing a function of moving the pin 32 up and down along axis A-A is also acceptable. The base plate 20 is shown to be aluminum; however, steel and plastic are also contemplated. The nut of the nut and washer combination 38 is shown to be steel and the washer is shown to be spring steel; however, other materials such as aluminum and plastic may also be appropriate in some cases. The thrust washer 36, pin 32, lock plate 30, bolt 22, washer 24, and nut 26 are shown to be stainless steel; however, other steels, aluminum, and plastic could be used. The retainer is contemplated to be aluminum, steel, or plastic.

An alternative exemplary embodiment assembly 10' is shown in FIGS. 8-15. In general, elements similar in nature to those of the first embodiment share the same element number and work in a similar manner.

Figure 14:
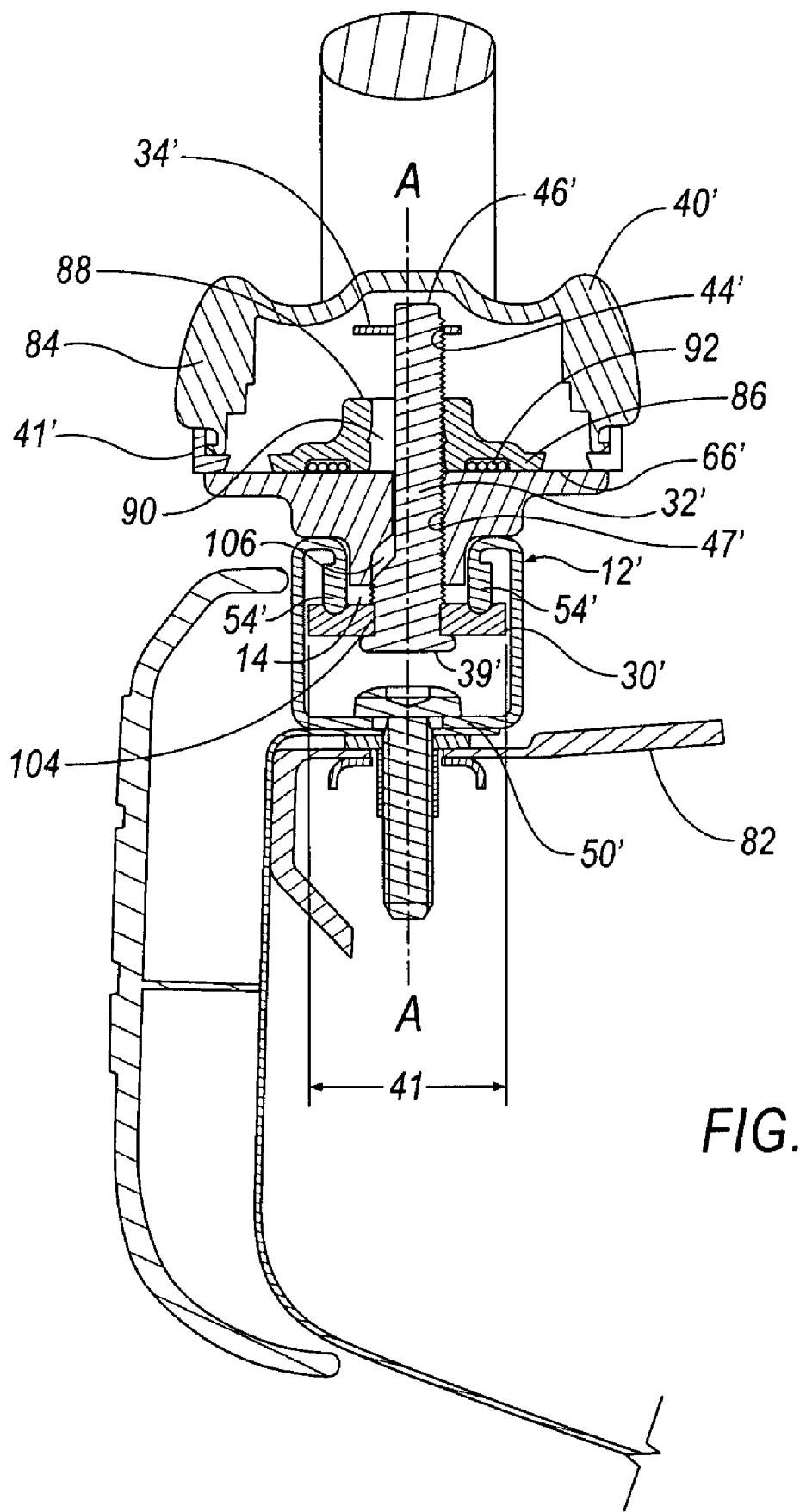
FIG. 14 is a cross-sectional view of the alternative embodiment shown in FIG. 8 taken at a position along the longitudinal length of a rail. The alternative embodiment is shown in a final secured orientation.

Assembly 10' includes a one-piece housing 80 that integrates both a tie-down 18' and a base plate 20'. FIG. 14 shows assembly 10' in a secured orientation, attached to a vehicle surface 82 by way of a rail 12'. Rail 12' is similar in design to rail 12, with legs 54' somewhat thickened as they turn inward toward bottom surface or web 50'

Actuating member 40' is illustrated as a ratcheting cap in mechanical communication with a pin 32' and a lock plate 30'. As member 40' is rotated, pin 32' moves up or down, depending on the direction of rotation of the actuating member 40', and they are threadingly engaged with one another. Actuating member 40' is hollow, having an upper portion 84 and a lower portion 86. Lower portion 86 has an upper surface 88 and an opening 90. Opening 90 threadingly engages pin 32' such that as actuating member 40' is rotated, pin 32' moves up and down.

The pin 32' includes a radially inwardly extending notch 44' receiving a radially outwardly extending retainer 34'. Retainer 34' prevents pin 32' from passing through opening 90 and selectively engages surface 88. It limits the longitudinal movement of pin 32' downwardly. However, pin 32' is also limited in longitudinal movement upwardly. End 46' can selectively strike the underside of upper portion 84. Alternatively, as shown, aperture 47' and pin 32' can be shaped so that upward movement of pin 32 is prevented when a thickened region 104 of pin 32' bottoms out in a counterbore 106 of aperture 47'. The mating surfaces are angled to provide additional areas of contact and minimize accidental damage if there is over torquing of the pin 32' with respect to the base plate 20'.

Once again, lock plate 30' has a first dimension 41 and a second dimension 42, but unlike the first embodiment, no ears 43.

Figure 10:
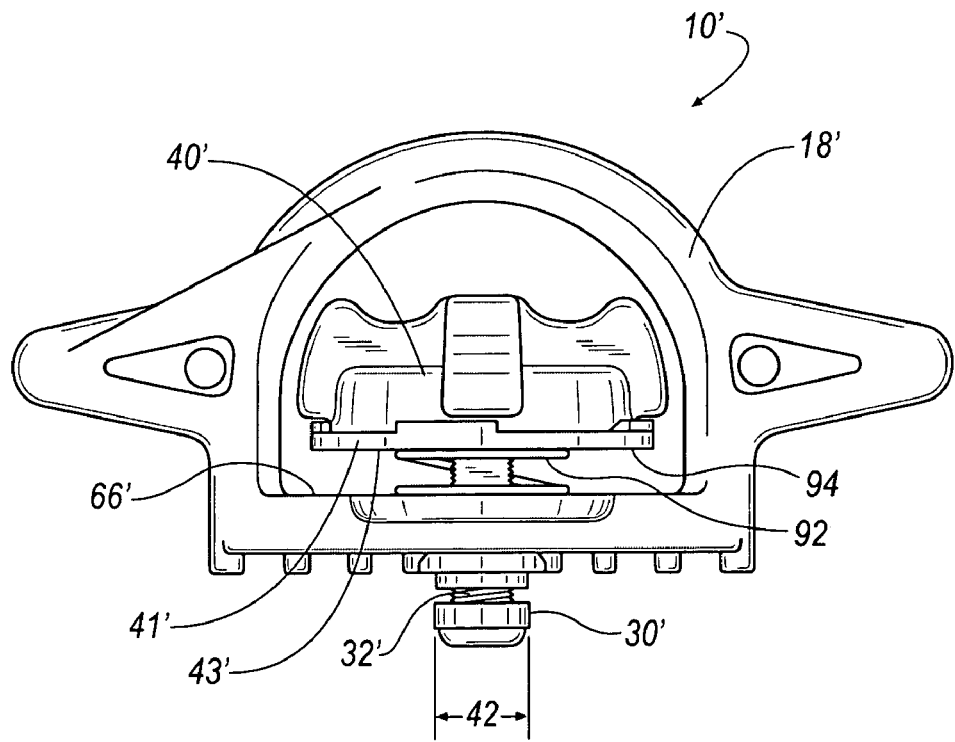
FIG. 10 is a side view of the alternative embodiment of FIG. 8 showing a biasing member urging an actuating member up into an unsecured position.

As shown in FIGS. 10 and 14, a biasing member in the form of a spring 92 biases actuating member 40' away from base plate 20' and lock plate 30' toward the base plate 20'. It is disposed between a lower surface 94 of the actuating member 40' and an upper surface 66' of base plate 20'. One goal is to have lock plate 30' closely adjacent to the underside of base plate 20' to facilitate the insertion of the assembly 10' into a rail 12'. Sometimes, insertion can be complicated if lock plate 30' extends longitudinally too far away from the rest of the assembly 10'.

Figure 9:
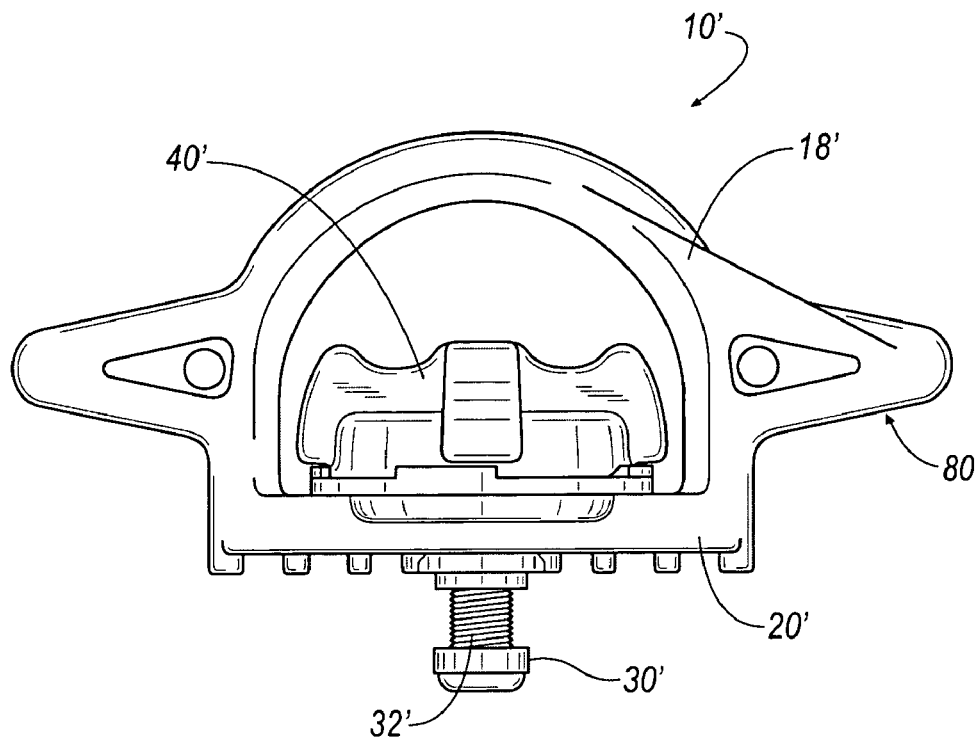
FIG. 9 is a side view of the alternative embodiment of FIG. 8 in a secured position.

FIG. 9 shows assembly 10' with the actuating member 40' depressed downwardly against the biasing force of the spring 92. Spring 92 is also compressed when assembly 10' is in a secured orientation as shown in FIG. 14.

Figure 12:
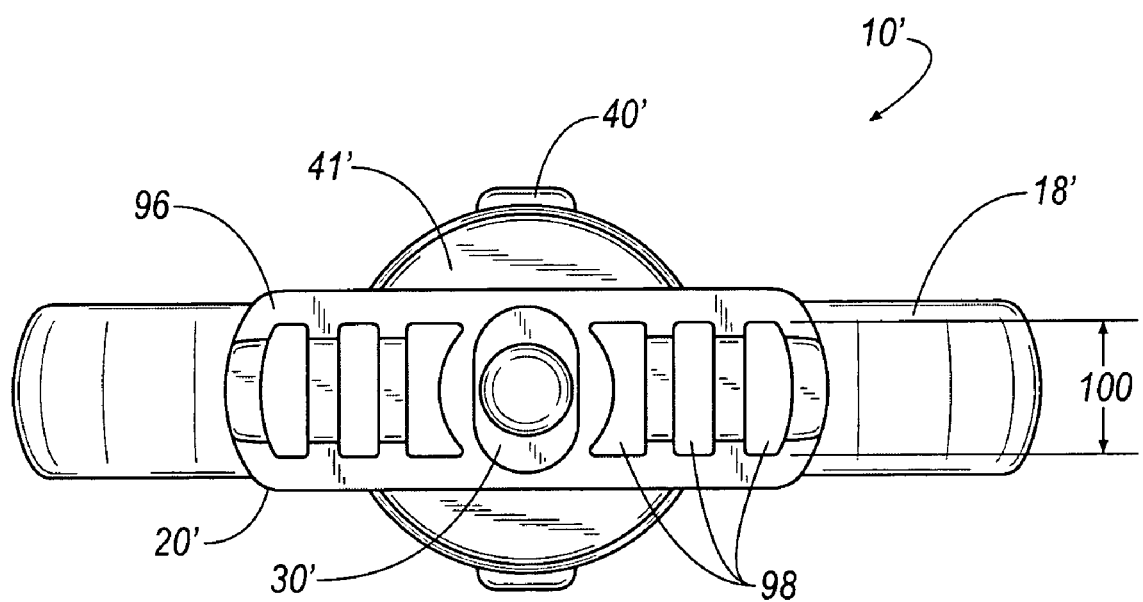
FIG. 12 is a bottom view of the alternative embodiment of FIGS. 8-11.

The lowermost surface 96 of base plate 20' includes a plurality of protrusions 98 extending away from the base plate 20'. As shown in FIG. 12, the protrusions 98 have a common width 100 smaller than dimension 58 of the channel 14'. They help to prevent accidental rotation of the assembly 10' when it is in its secured orientation by being received within channel 14' of the rail 12' and trapped between legs 54'.

Figure 11:
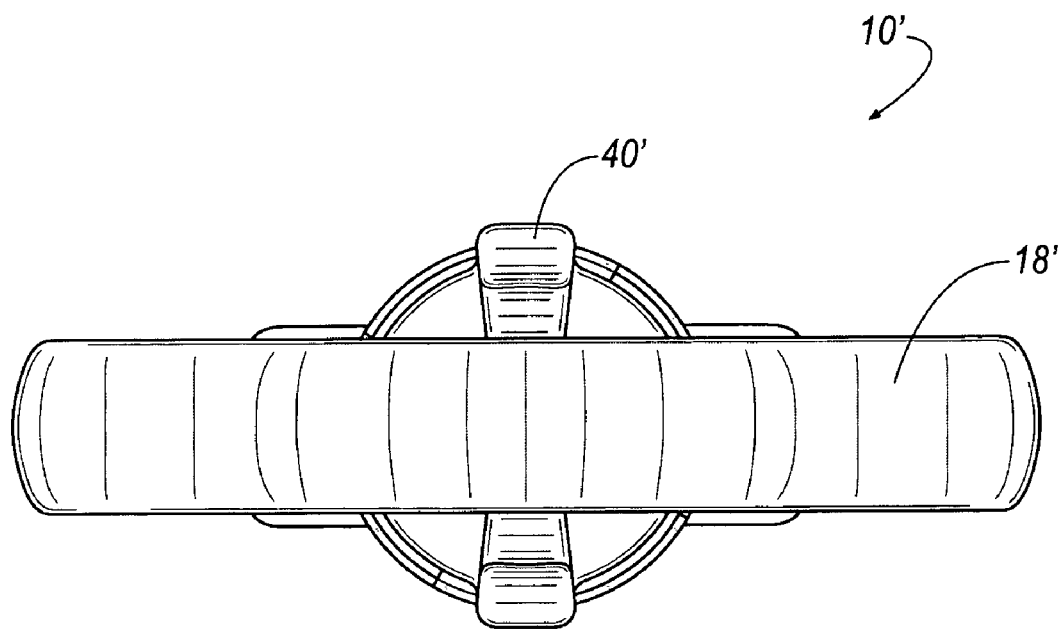
FIG. 11 is a top view of the alternative embodiment of FIGS. 8-10.
Figure 13:
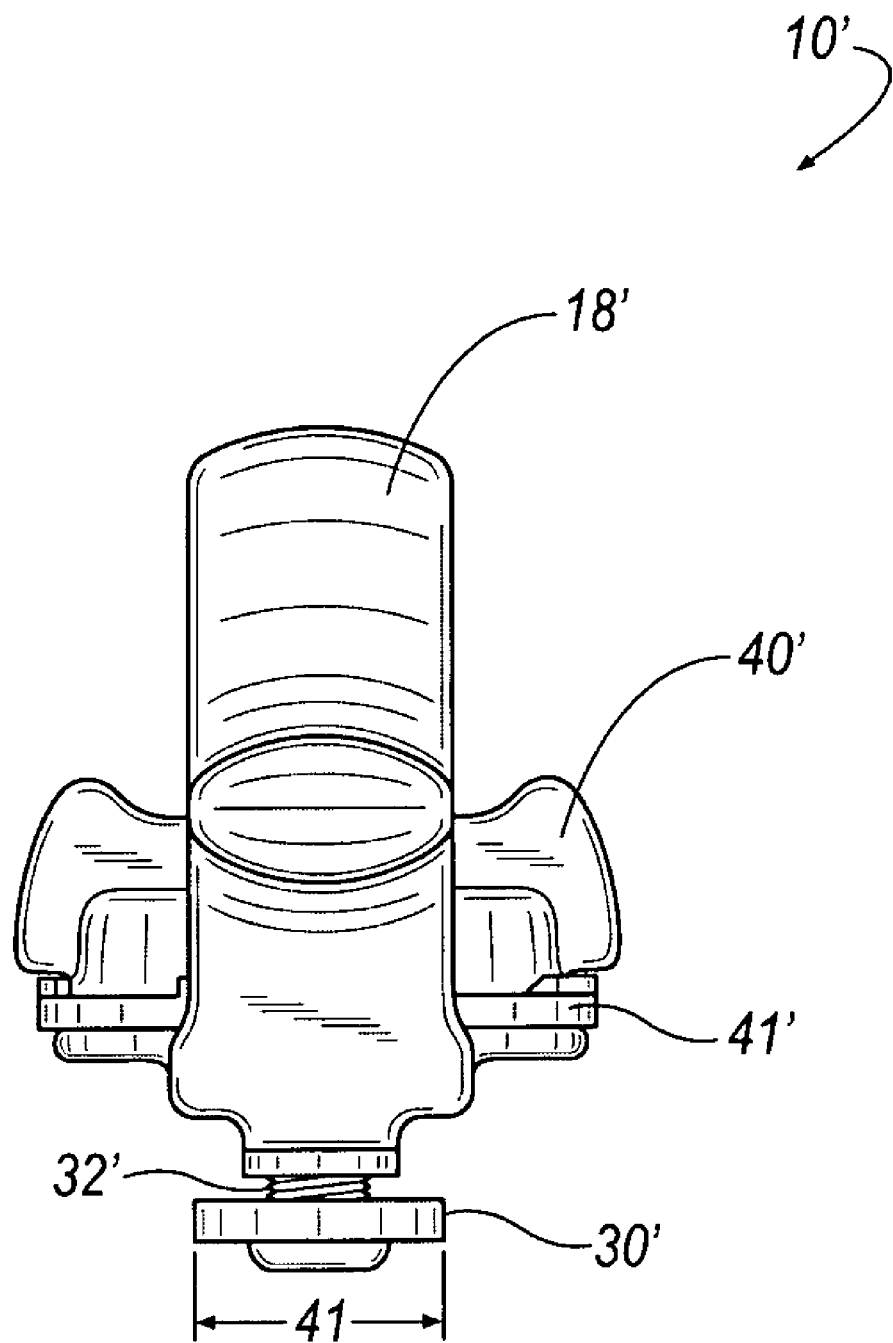
FIG. 13 is a front view of the alternative embodiment of FIGS. 8-12.
Figure 15:
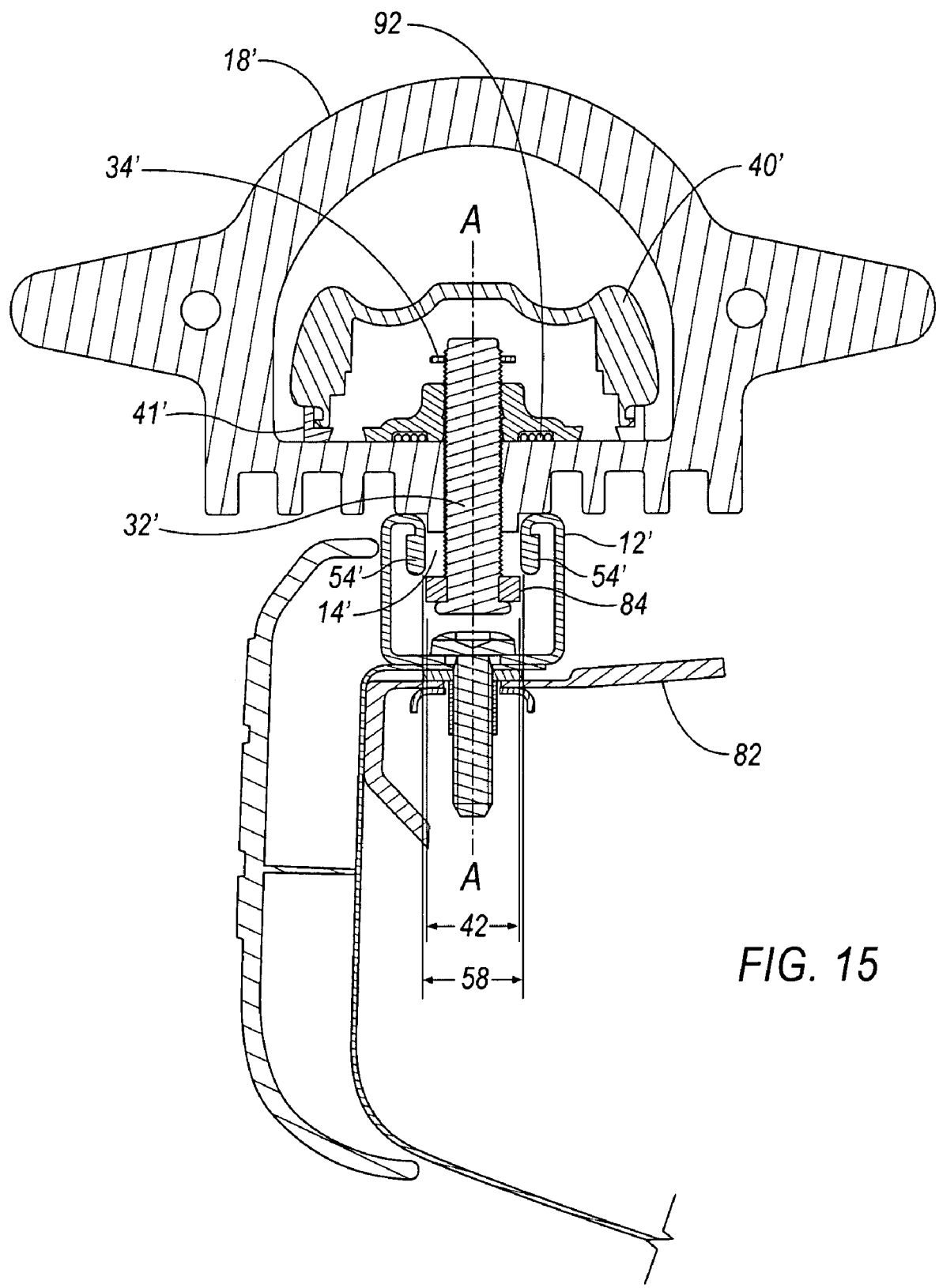
FIG. 15 is view similar to FIG. 14, but showing the alternative embodiment perpendicular to the rail in an unlocked position.

FIGS. 11, 12, and 13 show the top, bottom, and side views, respectively, of the housing 18' in a secured or closed orientation. In FIG. 15, the assembly 10' is shown in an unlocked position and unsecured position. To load the assembly 10' into the rail 12', the actuating member 40' must be manually pushed downwardly against the force of the biasing member 92 so that the second dimension 42 of the lock plate 30' is inserted into the channel 14' of the rail 12' when the assembly 10' has been properly aligned with channel 14'. The lock plate 30' must clear the legs 54' and take into account the presence of the protrusions 98 generally perpendicular to the longitudinal axis of the rail 12'. Then the entire assembly 10' is rotated approximately ninety degrees (90°) so that the first dimension 41 of the lock plate 30' may engage or otherwise interlock with the rail 12' at the legs 54' as shown in FIG. 14. Protrusions 98 extend into channel 14'. At least one benefit of using the biasing member 92 in this manner is that it forces the lock plate 30 against the legs 54' of the rail 12' holding the assembly 10' in place before the securing operation is executed. Then, actuating member 40' is rotated, clamping legs 54' of rail 12' between the base plate 20' and the lock plate 30' by way of longitudinal movement of pin 32'. To release assembly 10', the process is reversed.

Figure 16:
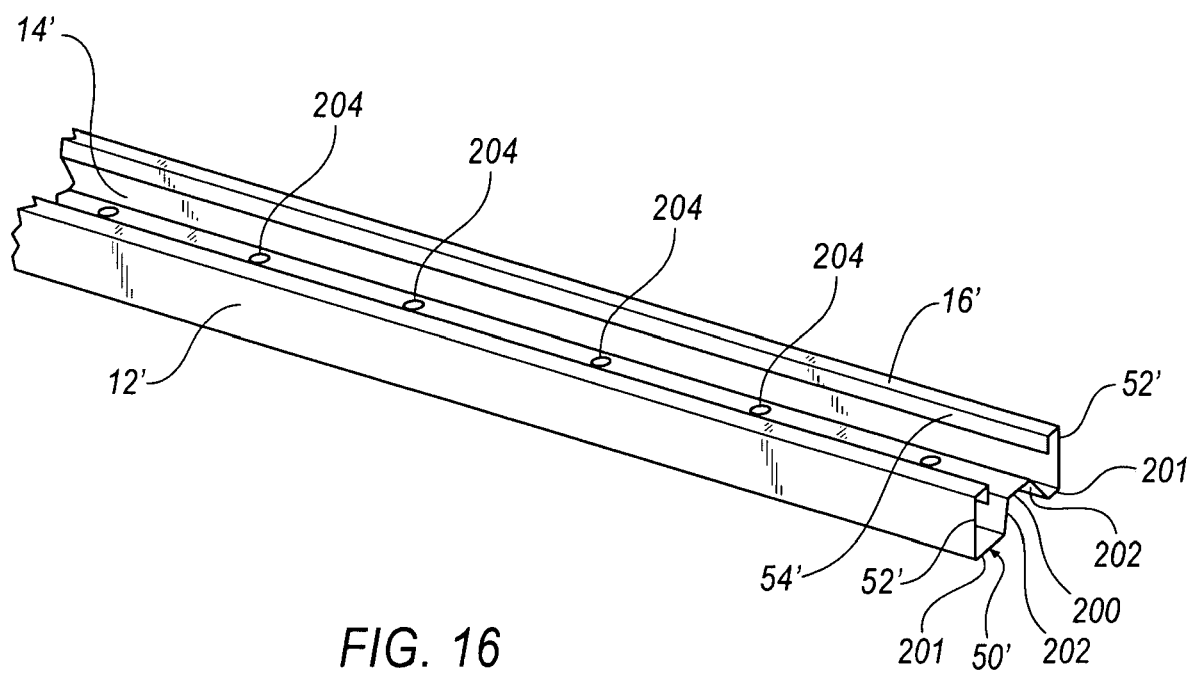
FIG. 16 is an elevated perspective view of an alternative embodiment of a rail.

One alternative embodiment of the rail 12' is shown in FIG. 16. In general, elements similar in nature to those of the previous embodiments share generally same element numbers and work in a similar manner. Rail 12' has a continuously extending channel 14' along its longitudinal length. The channel 14' of the rail 12' is defined by a web or bottom surface 50' disposed between opposing siderails 52'. Legs 54' extend into the channel 14' from a free end of each siderail 52'. An end cap (not shown) may be permanently secured to the rail 12', which may or may not contain notches. The bottom surface 50' includes two portions 201, each proximate a respective siderail 52', a raised portion 200 extending upwardly form portions 201. The raised portion 200 includes two inner side walls 202 defining the height of the raised portion 200. However, the raised portion 200 may be of any shape including rounded, partially rounded, and the like. The purpose of the raised portion 200 is to provide at least one elevated aperture 204 for mating with the tie-down cleat assembly 10, 10' as further discussed below. The elevated rail apertures 204 are spaced from one another a predetermined distance and are adapted to secure the tie-down cleat assembly 10, 10' at a predetermined location along the longitudinal length of the rail 12'.

As shown in FIGS. 17-21, the subassembly of the tie-down 18' and base plate 20' is secured to the rail 12' using a lock plate subassembly including a lock plate 30'', a pin 32'', a protrusion 206, and an actuating member 40'. The lock plate 30' is rigidly secured to the pin 32' at a distal end. Thus, as the pin 32' is rotated, the lock plate 30' is rotated to the same angular extent. Thus, the lock plate 30' does not spin independently of the pin 32'. In an alternative embodiment, lock plate 30' and pin 32' may be a single component.

Figure 20:
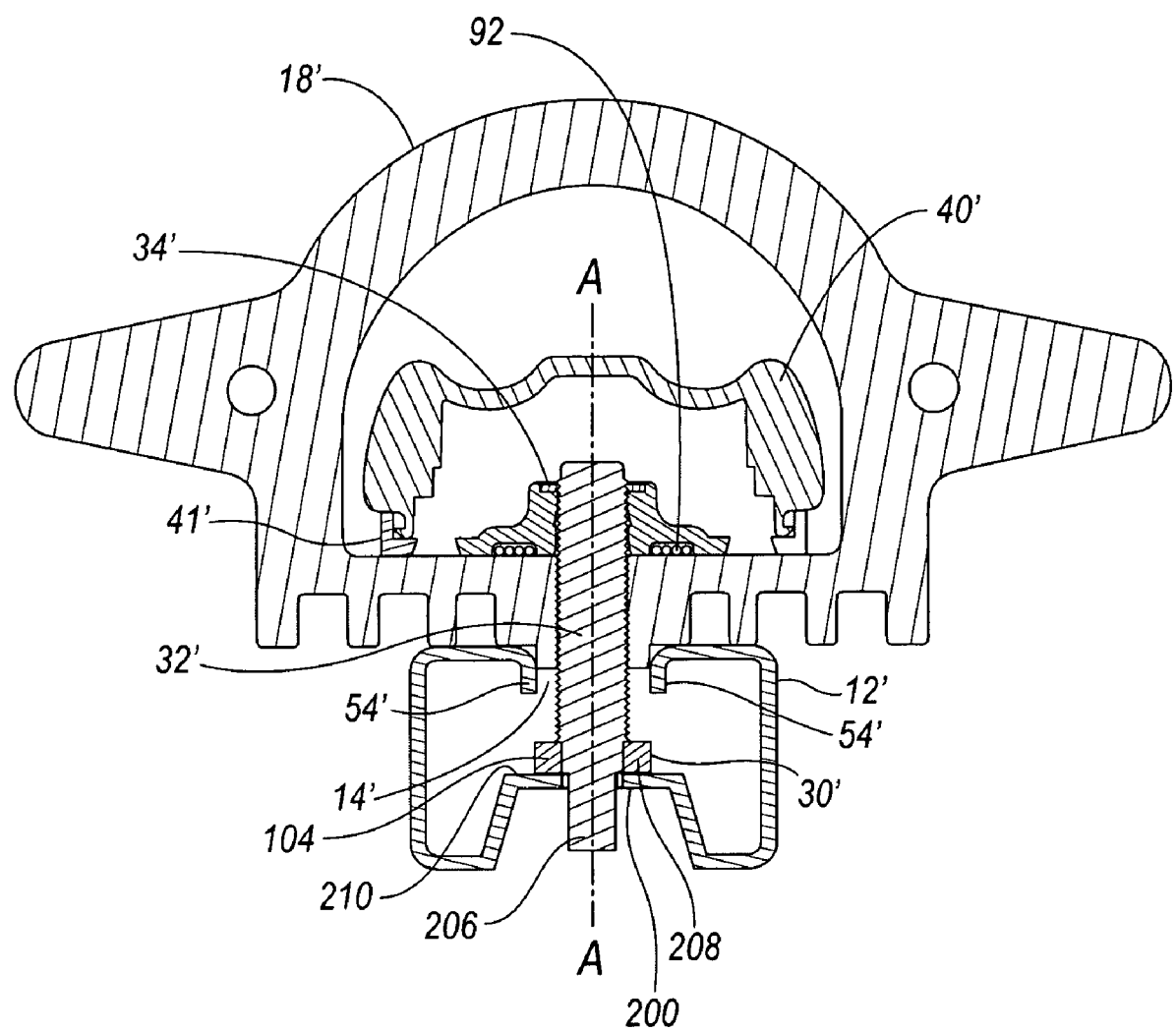
FIG. 20 is a cross-sectional view of the alternative embodiment shown in FIG. 17 along the longitudinal length of a rail. The alternative embodiment is shown perpendicular to the rail in an unlocked position.
Figure 21:
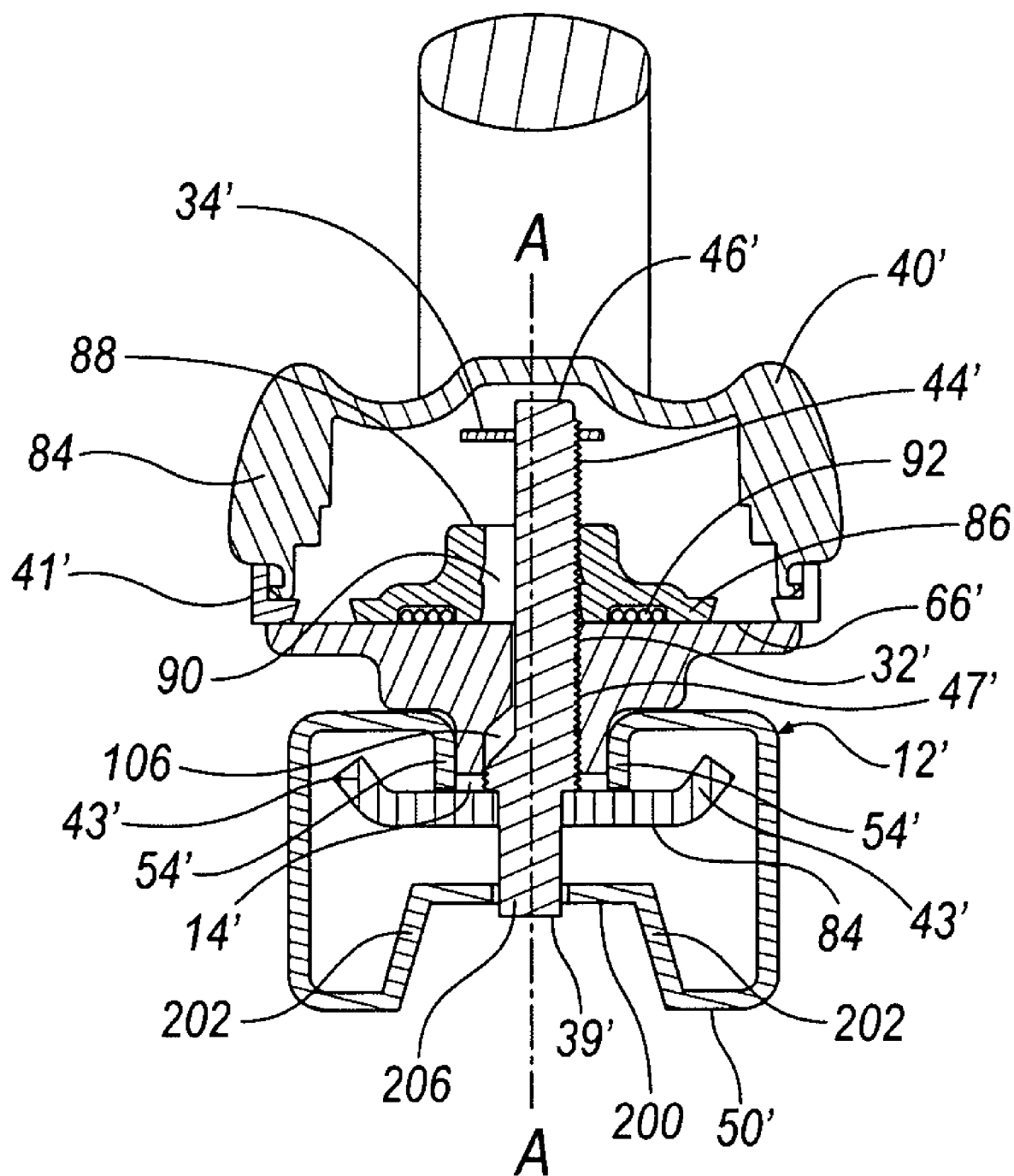
FIG. 21 is a cross-sectional view of the alternative embodiment shown in FIG. 17 along the longitudinal length of a rail. The alternative embodiment is shown in a final secured orientation.

The lock plate 30' includes two optional extending ears 43' as shown in FIG. 21 to help facilitate the selective gripping of legs 54' of rail 12' when the assembly 10, 10' is in a final secured orientation as discussed above. The protrusion 206 extends downwardly a predetermined distance for engaging the elevated rail apertures 204 of the rail 12'. As best shown in FIG. 20, the lower surface 208 of the lock plate 30' engages the upper surface 210 of the raised portion 200. This prevents the protrusion 206 from extending too far into the rail apertures 204 and damaging the vehicle surface.

Figure 17:
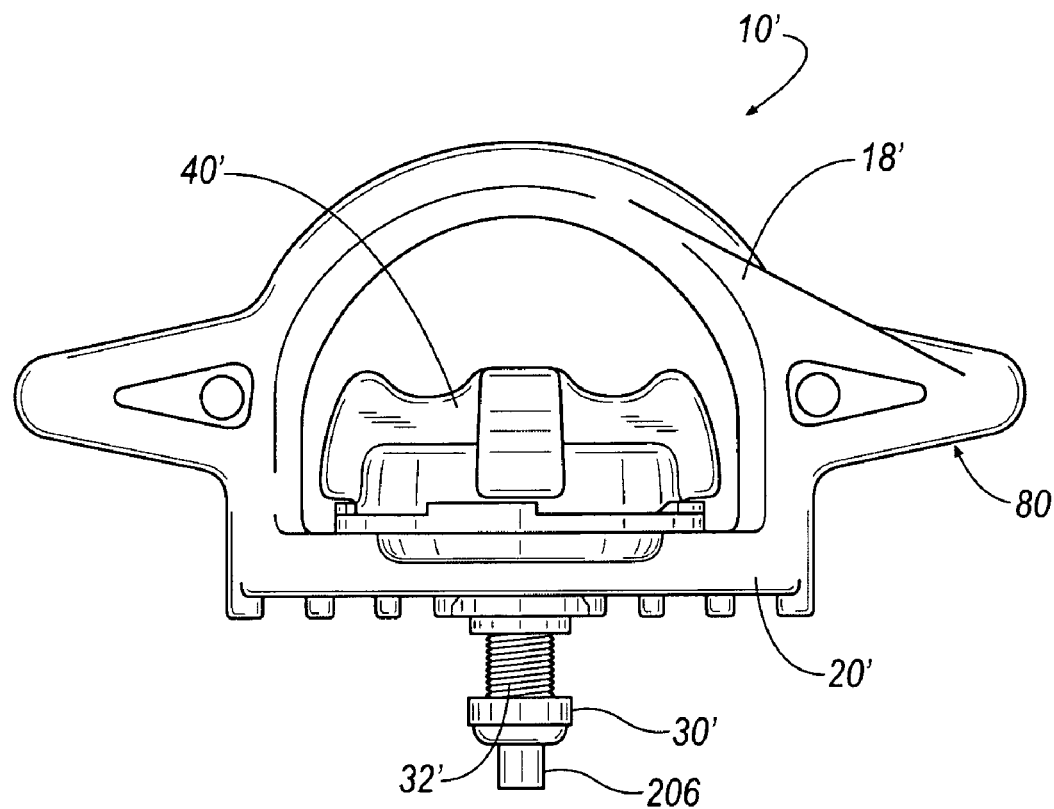
FIG. 17 is a side view of an alternative embodiment of a tie-down cleat in a secured position.
Figure 18:
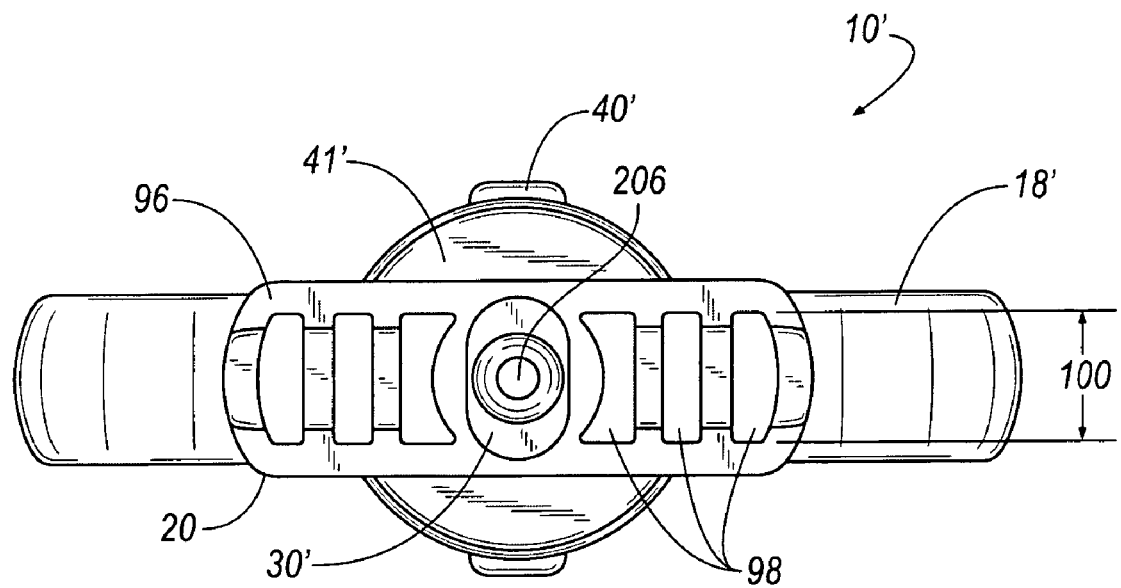
FIG. 18 is a bottom view of the alternative embodiment shown in FIG. 17.
Figure 19:
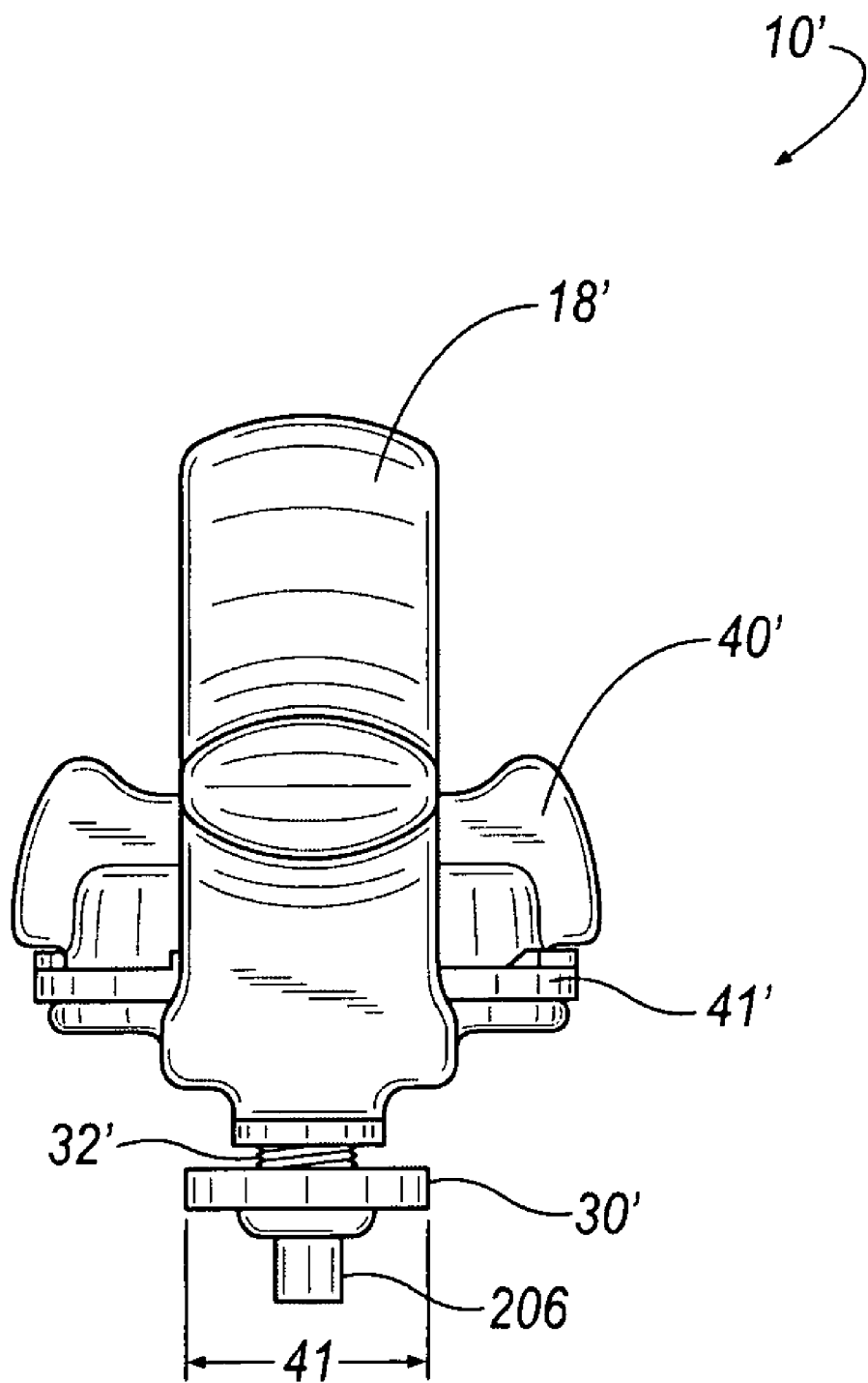
FIG. 19 is a front view of the alternative embodiment shown in FIG. 17.

FIGS. 17, 18, and 19 show the side, bottom and front views, respectively, of the housing 18' in a secured or closed orientation. In FIG. 17, the assembly 10' is shown in a secured position. To load the assembly 10' into the rail 12', the lock plate 30' is inserted into the channel 14' of the rail 12' as discussed above. The lock plate 30' must clear the legs 54' and take into account the presence of the elevated rail apertures 204. Then protrusion 206 is aligned and inserted into any one of a plurality of elevated rail apertures 204 as discussed above. The benefit of having the protrusion 206 engaged within the rail apertures 204 of the rail 12' is that the assemblies 10' may be placed at a predetermined locations on both sides of a vehicle. Furthermore, the rail apertures 204 provide a more secure mechanism for locking the assembly 10, 10' in place and preventing the assembly 10, 10' from moving along the length of the rail 12' when forces are applied to the assembly 10, 10'. Then the entire assembly 10, 10' is rotated approximately ninety degrees (90°) so that the lock plate 30' may engage or otherwise interlock with the rail 12' at the legs 54' as shown in FIG. 21. At least one benefit of using the biasing member 92 in this manner is that the biasing member 92 forces the lock plate 30 against the legs 54' of the rail 12', holding the assembly 10' in place before the securing operation is executed. Then, actuating member 40' is rotated, clamping legs 54' of rail 12' between the base plate 20' and the lock plate 30' by way of longitudinal movement of pin 32'. To release assembly 10', the process is reversed.

The exemplary embodiments have been particularly shown and described, which are merely illustrative of the best modes. It should be understood by those skilled in the art that various alternatives to the embodiments described herein may be employed in practicing the claimed invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. A tie-down cleat assembly for engagement with a mating component, the mating component including a channel, comprising:
   a pin extending along a generally longitudinal axis and having a first end and a second end;
   a lock plate adjacent to said second end, said lock plate including a projection for engagement with the mating component;
   a housing having an aperture, said pin extending through said aperture, said pin, said lock plate, and said housing being so configured that rotation of one of said pin and said lock plate about said longitudinal axis results in corresponding rotation of the other of said pin and said lock plate; and
   an actuating member operationally connected to said pin and causing selective movement of said pin and said lock plate between a secured and an unsecured orientation to secure the mating component between said housing and said lock plate, said lock plate being received in the channel in said secured orientation;
   wherein said actuating member is threadingly engaged with said pin, rotation of said actuating member resulting in longitudinal movement of said pin with respect to said housing and said actuating member.

2. The tie-down cleat assembly of claim 1, wherein said pin, said lock plate and said housing are so configured that rotation of one of said pin, said lock plate and said housing about said longitudinal axis results in a corresponding rotation of the other two of said pin, said lock plate, and said housing between said secured and said unsecured orientation.

3. The tie-down cleat assembly of claim 1, wherein said lock plate is formed with a first dimension and a second dimension smaller than said first dimension to permit said lock plate to be received within the channel of said mating component and said first dimension selectively trapping said lock plate within the channel.

4. The tie-down cleat assembly of claim 3, wherein a portion of said mating component is clamped between said lock plate and said housing by said pin and said actuating member when said lock plate is trapped within the channel of the mating component by way of the second dimension of said lock plate.

5. The tie-down cleat assembly of claim 4, wherein said lock plate is generally rectangular in shape.

6. The tie-down cleat assembly of claim 4, wherein said lock plate is configured to be freely rotated within the channel of the mating component.

7. A tie-down cleat assembly for engagement with a mating component, the mating component including a channel, comprising:
   a pin extending along a generally longitudinal axis and having a first end and a second end;
   a lock plate adjacent to said second end, said lock plate includes a projection for engagement with the mating component;
   a housing having an aperture, said pin extending through said aperture, said pin, said lock plate, and said housing being so configured that rotation of one of said pin and said lock plate about said longitudinal axis results in a corresponding rotation of the other of said pin and said lock plate between a secured and an unsecured orientation; and
   an actuating member operationally connected to said pin for causing selective movement of said pin and said lock plate between said secured and said unsecured orientation to secure the mating component between said housing and said lock plate, said lock plate being received in the channel in said secured orientation;
   whereby a portion of said pin and a portion of said aperture of said housing include a noncircular cross-section to minimize rotation of said pin with respect to said aperture.

8. The tie-down cleat assembly of claim 7, wherein said housing includes at least one base plate member and at least one tie-down member.

9. The tie-down cleat assembly of claim 8, wherein said base plate member selectively engages the mating component.

10. The tie-down cleat assembly of claim 8, wherein said base plate member includes a lowermost surface, at least one protrusion extending away from said lowermost surface and adapted to be received in the channel of the mating component, said protrusion minimizing rotation of said assembly within the rail when in said secured orientation.

11. The tie-down cleat assembly of claim 7, wherein said housing is a one-piece member.

12. The tie-down cleat assembly of claim 7, wherein the tie-down cleat assembly includes a biasing member disposed between said housing and said actuating member for biasing said actuating member away from a surface of said housing.

13. A tie-down cleat assembly for engagement with a mating component, the mating component including a channel, comprising:
   a pin extending along a generally longitudinal axis and having a first end and a second end;
   a lock plate adjacent to said second end, said lock plate includes a projection for engagement with the mating component;
   a housing having an aperture, said pin extending through said aperture, said pin, said lock plate, and said housing being so configured that rotation of one of said pin and said lock plate about said longitudinal axis results in a corresponding rotation of the other of said pin and said lock plate between a secured and an unsecured orientation; and an actuating member operationally connected to said pin for causing selective movement of said pin and said lock plate between said secured and said unsecured orientation to secure the mating component between said housing and said lock plate, said lock plate being received in the channel in said secured orientation;

whereby a portion of said pin and a portion of said aperture of said housing include a noncircular cross-section to minimize rotation of said pin with respect to said aperture, wherein said pin includes a notch extending inwardly from an outer periphery of said pin; a retainer received in said notch and extending outwardly from said periphery, said retainer selectively engaging a surface of said aperture to limit longitudinal movement of said pin within said housing.

14. A tie-down cleat assembly for engagement with a mating component, the mating component including a channel, comprising:

a pin extending along a generally longitudinal axis and having a first end and a second end;

a lock plate adjacent to said second end, said lock plate includes a projection for engagement with the mating component;

a housing having an aperture, said pin extending through said aperture, said pin, said lock plate, and said housing being so configured that rotation of one of said pin and said lock plate about said longitudinal axis results in a corresponding rotation of the other of said pin and said lock plate between a secured and an unsecured orientation; and an actuating member operationally connected to said pin for causing selective movement of said pin and said lock plate between said secured and said unsecured orientation to secure the mating component between said housing and said lock plate, said lock plate being received in the channel in said secured orientation;

whereby a portion of said pin and a portion of said aperture of said housing include a noncircular cross-section to minimize rotation of said pin with respect to said aperture, wherein said housing includes an upper surface and at least one groove adjacent to said aperture of said housing; a thrust washer engaging said upper surface, wherein said thrust washer includes an ear, said ear engaging said groove to minimize rotation of said thrust washer with respect to said housing.

\* \* \* \* \*